(12) United States Patent
Bhargava (10) Patent No.: US 11,745,116 B2
(45) Date of Patent: Sep. 5, 2023

(54) APPARATUS FOR A DIVIDING WALL COLUMN IN AN ISOMERIZATION UNIT

(71) Applicant: Manish Bhargava, Houston, TX (US)

(72) Inventor: Manish Bhargava, Houston, TX (US)

(73) Assignee: Manish Bhargava, Houston, TX (US)

( * ) Notice: Subject to any disclaimer, the term of this patent is extended or adjusted under 35 U.S.C. 154(b) by 0 days.

(21) Appl. No.: 17/491,846

(22) Filed: Oct. 1, 2021

(65) Prior Publication Data

US 2023/0105091 A1    Apr. 6, 2023

(51) Int. Cl.
*B01D 3/14* (2006.01)
*B01D 3/32* (2006.01)

(52) U.S. Cl.
CPC ............ *B01D 3/141* (2013.01); *B01D 3/146* (2013.01); *B01D 3/326* (2013.01); *B01D 3/328* (2013.01)

(58) Field of Classification Search
CPC ........ B01D 3/141; B01D 3/146; B01D 3/326; B01D 3/328
See application file for complete search history.

(56) References Cited

U.S. PATENT DOCUMENTS

| | | | | |
|---|---|---|---|---|
| 6,291,734 B1 * | 9/2001 | Stork | ................. | C10G 7/00 585/809 |
| 6,395,950 B1 * | 5/2002 | Rice | ................. | C07C 9/16 585/737 |
| 6,552,242 B1 * | 4/2003 | Rice | ................. | B01D 3/141 585/800 |
| 6,927,314 B1 * | 8/2005 | Schultz | ................. | C10G 45/62 585/737 |
| 7,371,912 B2 * | 5/2008 | Schultz | ................. | C07C 6/123 585/477 |
| 8,092,655 B2 * | 1/2012 | Burst | ................. | B01D 3/141 203/99 |
| 8,323,457 B2 * | 12/2012 | Townsend | ................. | F25J 3/0247 202/153 |
| 10,118,875 B1 * | 11/2018 | Kockler | ................. | C10G 7/02 |
| 10,918,967 B2 * | 2/2021 | Piszczek | ................. | C10G 7/00 |
| 11,052,324 B2 * | 7/2021 | Piszczek | ................. | B01D 3/143 |
| 11,207,611 B1 * | 12/2021 | Becker | ................. | C10G 7/00 |
| 2010/0145118 A1 * | 6/2010 | Zimmerman | ................. | C07C 7/163 585/258 |
| 2014/0107382 A1 * | 4/2014 | Shecterle | ................. | C07C 5/2767 585/258 |
| 2015/0211790 A1 * | 7/2015 | Bhargava | ................. | C10L 3/10 62/625 |
| 2020/0087229 A1 * | 3/2020 | Piszczek | ................. | C10G 7/12 |
| 2022/0033327 A1 * | 2/2022 | Piszczek | ................. | B01D 3/143 |
| 2022/0227688 A1 * | 7/2022 | Bhargava | ................. | C10G 7/00 |

* cited by examiner

*Primary Examiner* — Jonathan Miller
(74) *Attorney, Agent, or Firm* — Jason C. Cameron (57) ABSTRACT

An apparatus for a dividing wall column in an isomerization unit is disclosed. The apparatus includes a at least one primary vertical wall located at a first set of predetermined plurality of trays and configured to separate a feed from a first side cut; one or more walls placed at a second set of predetermined plurality of trays and configured to enable a second side cut wherein each of the one or more walls includes at least one predetermined shape, wherein the dividing wall column produces four cuts wherein one is hexane cut, wherein there are two walls in different sections of the column. The at least one primary vertical wall includes one of a straight wall, an 'L' shaped wall, an 'T' shaped wall, or a zig-zag wall. The one or more walls are mechanically coupled to form a second vertical wall.

10 Claims, 7 Drawing Sheets

APPARATUS FOR A DIVIDING WALL COLUMN IN AN ISOMERIZATION UNIT

FIELD OF INVENTION

Embodiments of a present disclosure relate to a fractionating column for removal of various fractions from the hydrocarbon mixture, and more particularly, to an apparatus for a dividing wall column in an isomerization unit using dividing wall column technology.

BACKGROUND

Dividing wall columns (DWC) are basically conventional columns fitted with a dividing wall on top, middle or bottom of columns having one or set of two or more walls at different locations inside the column thermally coupled capable of separating mixtures of three or more components into high purity products.

A typical ISOM unit includes four columns: the deisopentanizer (DIP) column at the front end of the unit, before the reactor section, and two columns at the back end of the unit after the reactor section. These columns are the ISOM Stabilizer and the Deisohexanizer (DIH) Column. Feed to the ISOM unit is the light naphtha cut from the overhead of the upstream Naphtha Splitter Column, consisting mainly of C5-C6 hydrocarbons along with traces of light ends (C4's) and heavies (C7+) hydrocarbons. The feed is sent directly to the first column—the DIP column which concentrates the isopentane (iC5) fraction at the top, from where it is recovered as the overhead product. The remaining nC5+ fraction from the bottom of the DIP column is sent to the ISOM reactor where the low octane feed is converted into higher octane product in the presence of a catalyst and hydrogen gas. Benzene saturation also takes place inside the reactor.

Further, the reactor effluent is sent to a separator drum where vapor-liquid phases are separated. The flashed gas is recycled back to the reactor section and the separator liquid, which is called unstable isomerate, is sent to the ISOM stabilizer column for removal of dissolved light ends. The lighter hydrocarbons are removed in the ovhd off-gas; while the stable isomerate from the bottom of the stabilizer column is sent to the Deisohexanizer (DIH) column The DIH column is typically a three-cut column producing the light isomerate product from the top, the heavy isomerate product from the bottom, and a n-hexane (nC6) rich side cut, which is recycled back to the upstream reactor section. The light isomerate, rich in i-C6 components is often blended with the heavy isomerate to make a single high octane isomerate product—ready for blending into the gasoline pool of the refinery. Sometimes, some refiners produce another product from the ISOM unit which is called food grade hexane (FGH) which is recovered from C6 recycle stream from the DIH column going back to the ISOM reactor. This requires an additional column called the FGH Column whereby food grade hexane (concentrated n-C6) is produced as the top product, and the bottoms stream is recycled back to the reactor.

In a conventional approach, a stabilizer column operate at relatively high pressures and at the concept of partial condensation as a result of which liquid losses to the off gases are high. Moreover, the Naphtha splitter prior to the isomerization unit also operate at high pressure on moderately expensive heating medium which is a MP steam. Presence of multiple distillation columns some operating at high pressure and temperatures makes the conventional isomerization unit an energy intensive operation and uses lot of space too.

Henceforth, a single column using dividing wall has the potential to combine two conventional columns into one and has the potential to address the above-mentioned issues.

Therefore, there is a need for an improved apparatus for a dividing wall column in an isomerization unit using dividing wall column technology.

BRIEF DESCRIPTION

In accordance with one embodiment of the disclosure, an apparatus for a dividing wall column in an isomerization unit is disclosed. The apparatus includes at least one primary vertical wall located at a first set of predetermined plurality of trays and configured to separate a feed from a first side cut. The apparatus also includes one or more secondary vertical walls placed at a second set of predetermined plurality of trays and configured to enable a second side cut wherein each of the one or more secondary vertical walls includes at least one predetermined shape, wherein the dividing wall column produces four cuts wherein one is hexane cut, wherein there are two walls in different sections of the column. The at least one primary vertical wall includes one of a straight wall, an 'L' shaped wall, an 'T' shaped wall, or a zig-zag wall, wherein the zig-zag wall is configured to provide more active area on the feed side. The one or more secondary vertical walls are mechanically coupled to form a second vertical wall. The apparatus also includes a pump is located around the one or more secondary vertical walls and configured to reduce the reboiler duty.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an apparatus for a dividing wall column in an isomerization unit using dividing wall column technology. The dividing wall column includes at least one primary vertical wall located at the first set of predetermined plurality of tray. The at least one primary vertical wall is configured to separate feed from a first cut. Further, a primary top section of the at least one vertical wall is open and configured for mass transfer between vapor and liquid between a column section above the dividing wall column, wherein a primary bottom section of the at least one vertical wall is open and configured for mass transfer between vapor and liquid with the column section below the dividing wall column. The dividing walls also includes one or more secondary vertical walls placed at a second predetermined plurality of trays. The one or more secondary vertical walls is configured to enable a second side cut. Each of the one or more secondary vertical walls corresponds to at least one predetermined shape. Further, a secondary top section of the one or more secondary vertical is closed and there is no mass transfer between vapor and liquid with the column section above the dividing wall, wherein a secondary bottom section of the wall is open and there is mass transfer between vapor and liquid with the column section below the dividing wall.

Figure 1:
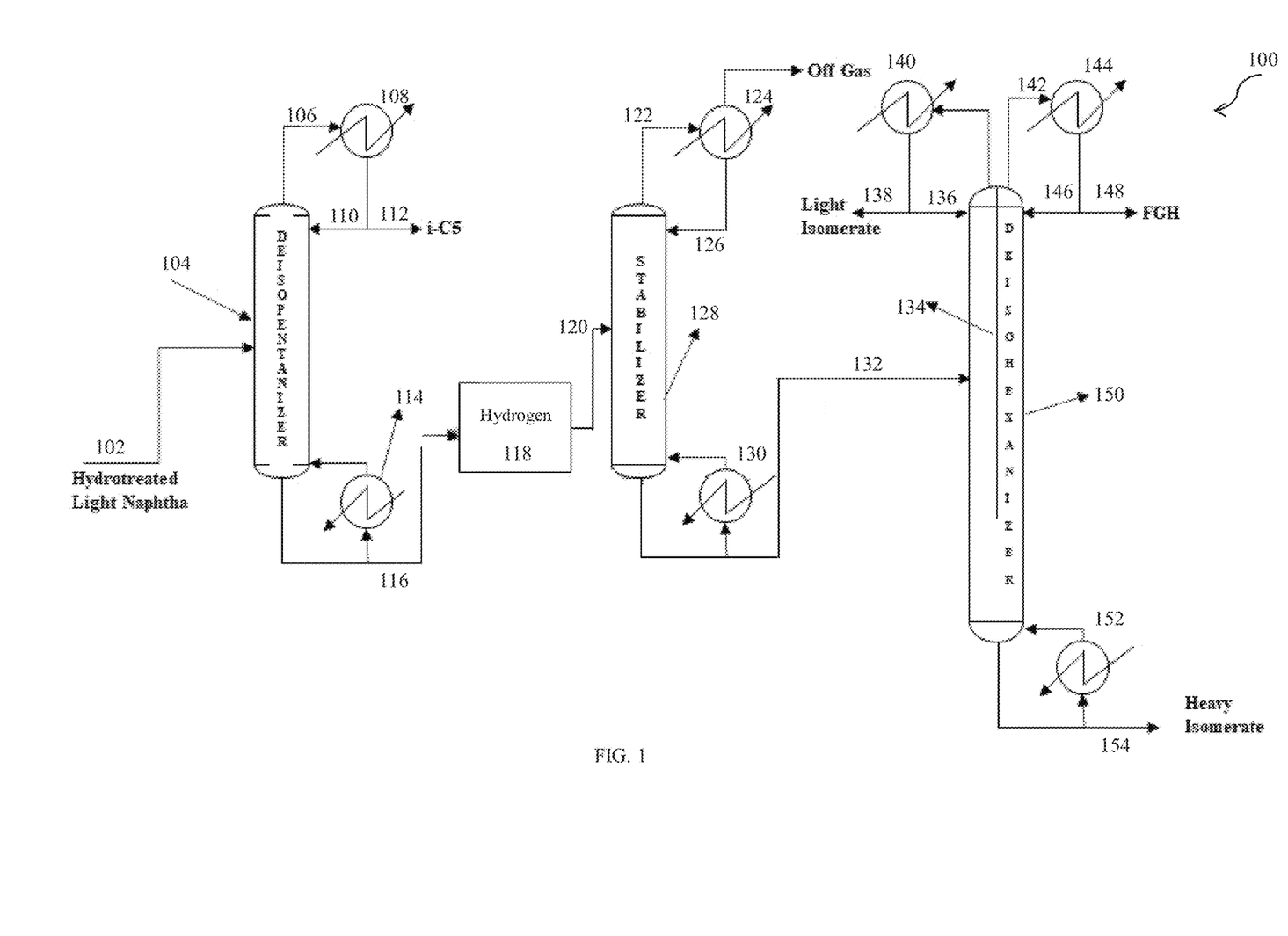
FIG. 1 is a schematic representation of an embodiment of a once-through $C_5/C_6$ isomerization unit with option to produce a food grade hexane (FGH) product using a top dividing wall column (DWC) in accordance with prior art.

FIG. 1 is a schematic representation of an apparatus 100 of a once-through C5/C6 isomerization unit with option to produce a food grade hexane (FGH) product using a top dividing wall column (DWC) in accordance with prior art. Hydrotreated light Naphtha 102 is transferred to a deisopentanizer column 104. An output 106 from the deisopentanizer unit 104 is transmitted to a first total condenser 108 to obtain 1-C5 in step 110 and 112. A reboiler 114 which is coupled at a bottom section of the deisopentanizer unit 104, and an output 116 from the reboiler 114 is transmitted to an ISMO reactor 118. Consequently, an output from the ISMO reactor 118 is transmitted to a stabilizer 128, wherein a top section 122 of the stabilizer 128 is coupled to a partial condenser 124, wherein off gas is removed from the apparatus, and other output is sent back to the stabilizer 128 from the top section in step 126.

Furthermore, a bottom section of the stabilizer 128 is coupled to reboiler 130 whose output 132 is transmitted to a deisohexanizer unit 150. A wall in top section 134 is placed inside the deisohexanizer unit 150. A top portion of the deisohexanizer unit 150 is operatively coupled to a total condenser 140 and a sixth condenser 144 via an outlet pipe 142 to obtain light isomerate in step 136 and 138; and FGH in step 146 and 148 respectively. Furthermore, a bottom section of the deisohexanizer unit 150 is coupled to a reboiler 152 to obtain heavy isomerate in step 154.

In operation, the apparatus 100 is directed to the DIH and FGH columns in the C5/C6 isomerization process wherein individual columns, such as a grassroots column or existing, are replaced with or modified into a Dividing Wall Column with the objective of minimizing the equipment count and/or utility consumption. The DIH column 150 is capable of producing three cuts such as the light isomerate 138, the FGH stream 148 and the heavy isomerate stream 154 from the bottom.

Figure 2:
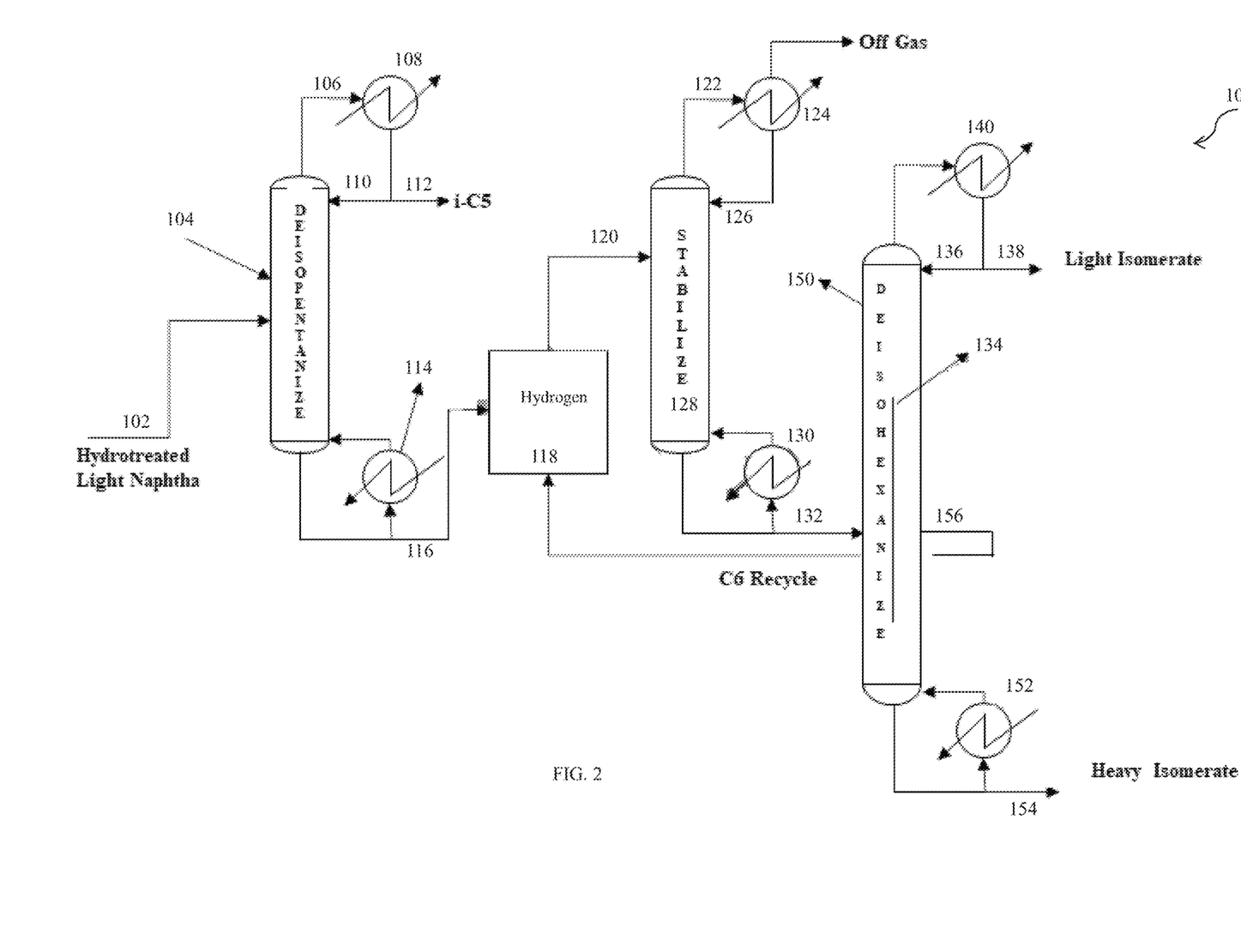
FIG. 2 is a schematic representation of an exemplary embodiment of a three-cut middle dividing wall column in accordance with prior art.

FIG. 2 is a schematic representation of an exemplary embodiment of a three-cut middle dividing wall column in accordance with an embodiment of the present disclosure. Hydrotreated light Naphtha 102 is transferred to a deisopentanizer unit 104. An output 106 from the deisopentanizer unit 104 is transmitted to a first total condenser 108 to obtain 1-C5 in step 110 and 112. A reboiler 114 which is coupled at a bottom section of the deisopentanizer unit 104, and an output 116 from the column 104 is transmitted to an ISMO reactor 118. Consequently, an output from the ISOM reactor 118 is transmitted to a stabilizer 128, wherein a top section 122 of the stabilizer 128 is coupled to a condenser 124, wherein off gas is removed from the apparatus, and other output is sent back to the stabilizer 128 from the top section in step 126. Furthermore, a bottom section of the stabilizer 128 is coupled to a reboiler 130 whose output 132 is transmitted to a deisohexanizer unit 150. A wall 134 is placed inside the deisohexanizer unit 150. A top portion of the deisohexanizer unit 150 is operatively coupled to a condenser 140 to obtain light isomerate in step 136 and 138. Furthermore, a bottom section of the deisohexanizer unit 150 is coupled to a reboiler 152 to obtain heavy isomerate in step 154. Also, n-C6 stream 156 is concentrated.

In prior art, a conventional DIH column in the ISOM unit is replaced with a middle dividing wall 134 in the column. As the DIH column is one of the tallest columns in the ISOM unit and produces the final isomerate product i.e. the light isomerate 138 and the heavy isomerate 154 while concentrating the n-C6 stream 156 for recycling back to the reactor. This is also the most energy intensive column in the entire unit, and typically contains over 80 trays. The middle dividing wall 134 isolates the C6 recycle side draw product from the mixing effects of the column feed, thereby reducing the number of overall trays required for the separation of three cuts. The invention significantly reduces the column height along with reboiler 152 duty, size and utility consumption, all while maintaining product quality.

Figure 3:
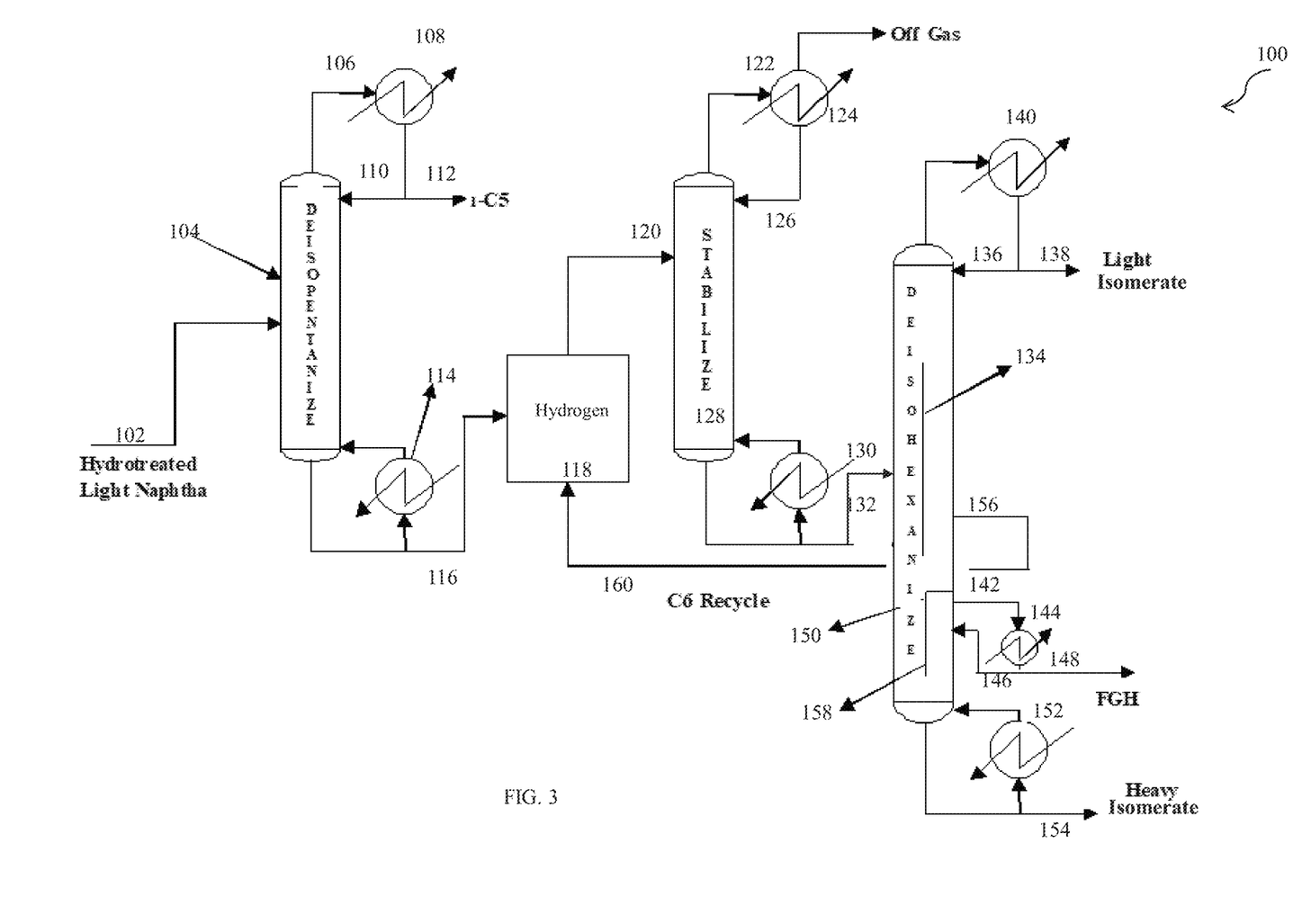
FIG. 3 is a schematic representation of an exemplary embodiment of a four-cut DWC, with two walls middle and inverted "L" shape in accordance with an embodiment of the present disclosure.
Figure 4:
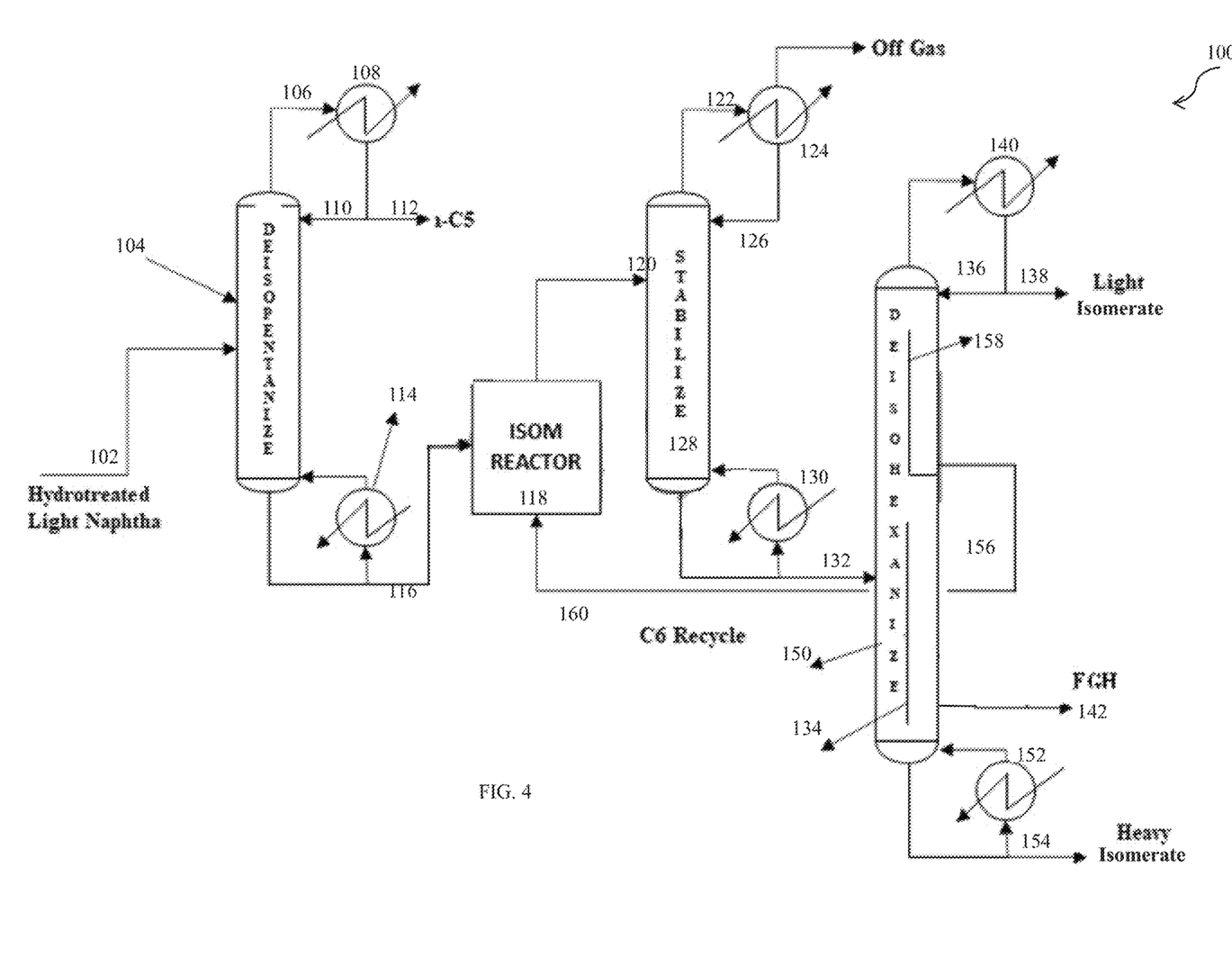
FIG. 4 is a schematic representation of an exemplary embodiment of a four-cut middle DWC, with two walls wherein Deisohexanizer (DIH) design with "L" shape dividing wall column (DWC) with one middle wall in a ISOM unit producing FGH product in accordance with an embodiment of the present disclosure.

Turning to FIGS. 3 and 4, FIG. 3 is a schematic representation of an exemplary embodiment of a four-cut DWC, with two walls middle and inverted "L" shape in accordance with an embodiment of the present disclosure. FIG. 4 is a schematic representation of an exemplary embodiment of a four-cut middle DWC, with two walls wherein Deisohexanizer (DIH) design with "L" shape dividing wall column (DWC) with one middle wall in a ISOM unit producing FGH product in accordance with an embodiment of the present disclosure.

Hydrotreated light Naphtha 102 is transferred to a deisopentanizer unit 104. An output 106 from the deisopentanizer unit 104 is transmitted to a first total condenser 108 to obtain 1-C5 in step 110 and 112. A reboiler 114 which is coupled at a bottom section of the deisopentanizer unit 104, and an output 116 from the reboiler 114 is transmitted to an ISMO reactor 118. Consequently, an output from the ISMO reactor 118 is transmitted to a stabilizer 128, wherein a top section 122 of the stabilizer 128 is coupled to a partial condenser 124, wherein off gas is removed from the apparatus, and other output is sent back to the stabilizer 128 from the top section in step 126. Furthermore, a bottom section of the stabilizer 128 is coupled to a reboiler 130 whose output 132 is transmitted to a deisohexanizer unit 150. A vertical wall 134 is placed inside the deisohexanizer unit 150 at a middle section and an 'T' shaped wall 158 placed at a bottom section of the deisohexanizer unit 150 (as shown in FIG. 3). Also, a vertical wall 134 is placed inside the deisohexanizer unit 150 at the bottom section and an 'L' shaped wall 158 placed at a top section of the deisohexanizer unit 150 (as shown in FIG. 4). A top portion of the deisohexanizer unit 150 is operatively coupled to a fifth partial condenser 140 to obtain light isomerate in step 136 and 138.

A mid-bottom section of the deisohexanizer unit 150 is operatively coupled to a sixth partial condenser 144 via an outlet pipe 142 to obtain FGH in step 146 and 148. Further, the bottom section of the deisohexanizer unit 150 is coupled to a seventh partial condenser 152 to obtain heavy isomerate in step 154.

In operation, two conventional columns in an ISOM unit which is the DIH column and the FGH column are replaced with a single DWC consisting of two vertical walls 134 and 158. The walls are strategically placed inside the DIH column 150 to ensure isolation of the C6 recycle stream 160, and the FGH product stream 148 from the mixing effects of column feed, and the light isomerate 138 and heavy isomerate products 154 drawn from the same column as top and bottom products. The innovative design eliminates the need for an additional column (FGH Column) and other associated equipment like reboiler and bottoms pumps.

Figure 5:
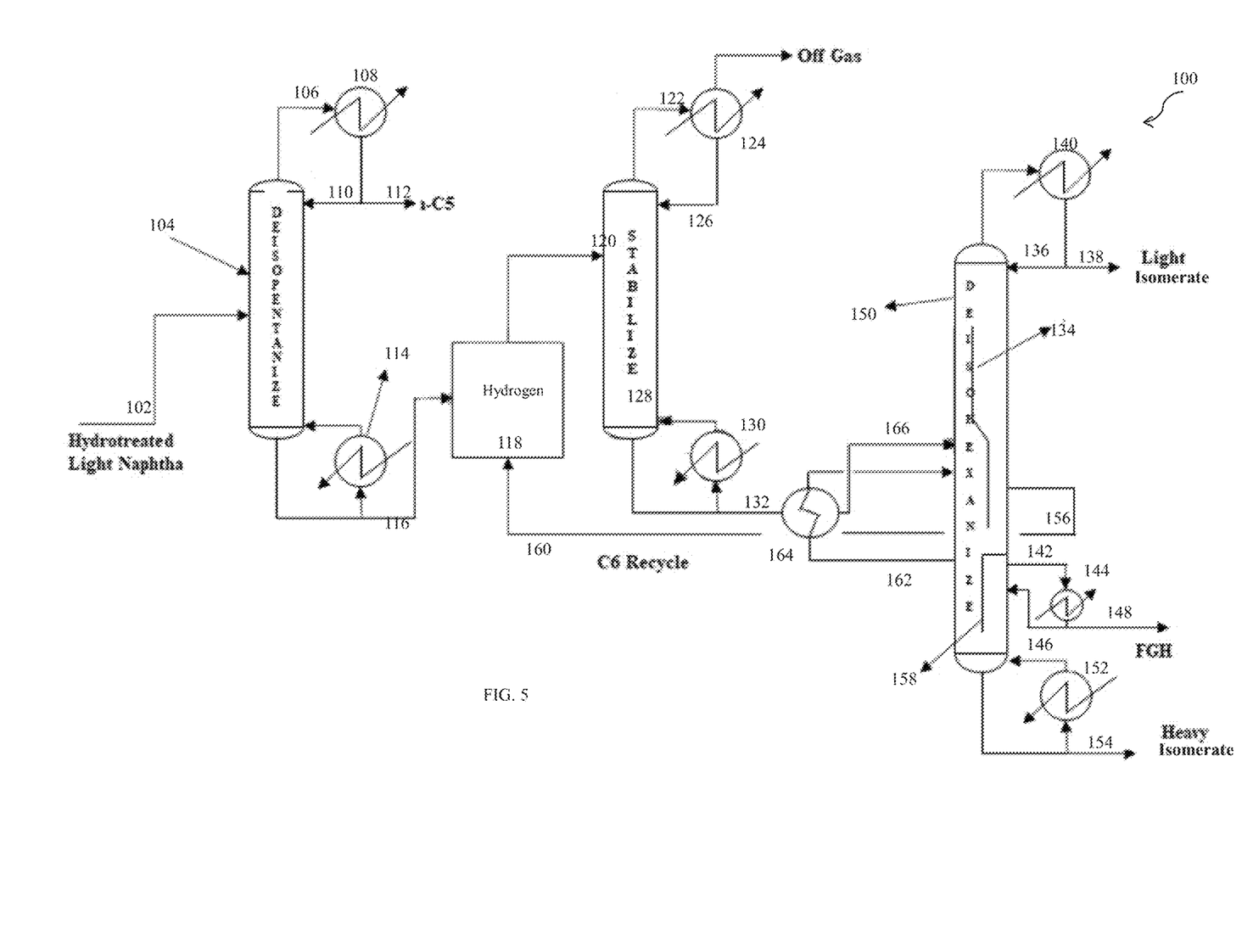
FIG. 5 is a schematic representation of an exemplary embodiment of a four-cut DWC, with two walls zig-zag and inverted "L" shape in accordance with an embodiment of the present disclosure.
Figure 6:
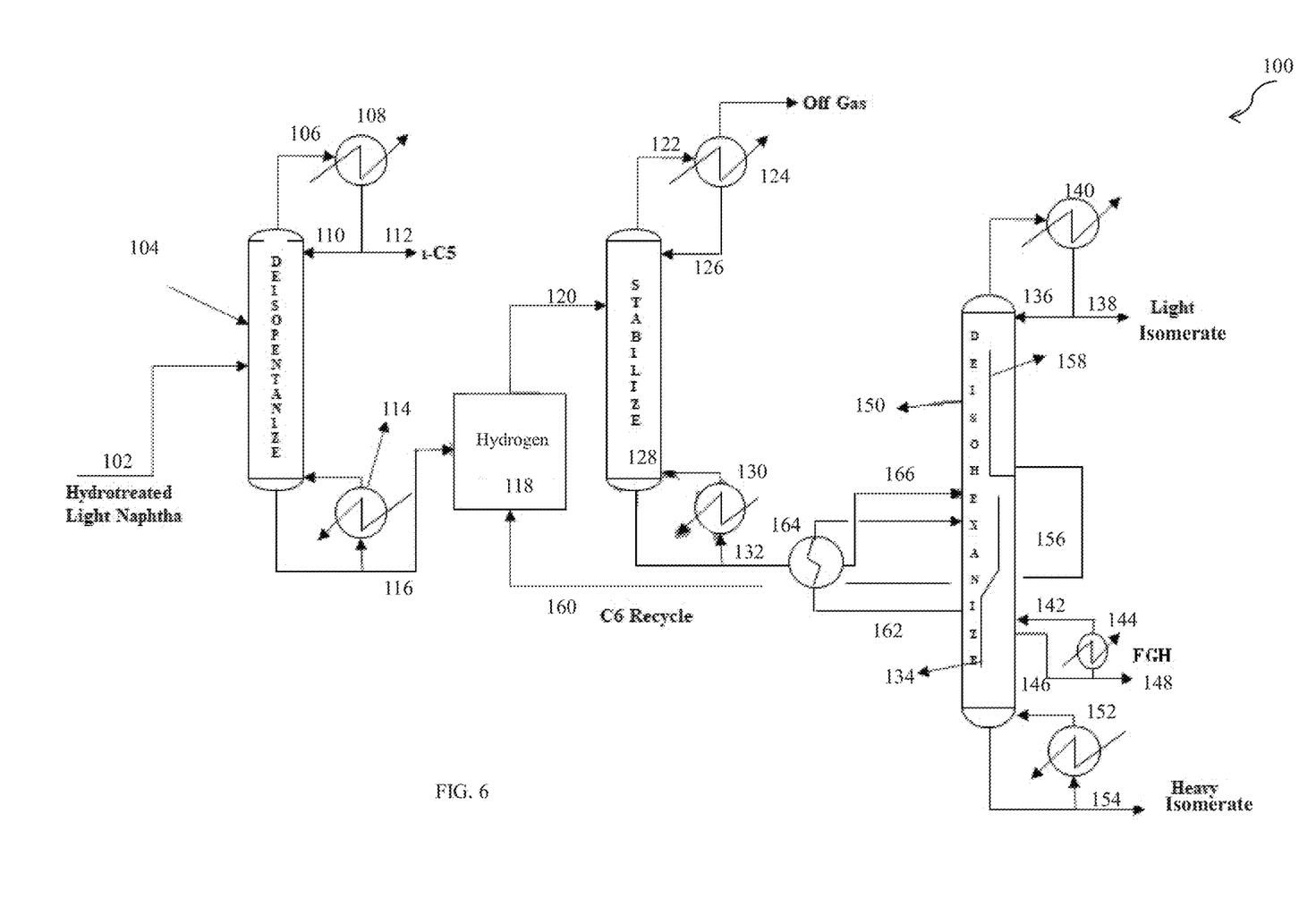
FIG. 6 is a schematic representation of an exemplary embodiment of a four-cut middle DWC, with two walls in Deisohexanizer (DIH) design with "L" shape dividing wall column (DWC) with one zig-zag wall in a ISOM unit producing FGH product in accordance with an embodiment of the present disclosure.

Referring to FIGS. 5 and 6, FIG. 5 is a schematic representation of an exemplary embodiment of a four-cut DWC, with two walls zig-zag and inverted "L" shape in accordance with an embodiment of the present disclosure. FIG. 6 is a schematic representation of an exemplary embodiment of a four-cut middle DWC, with two walls in Deisohexanizer (DIH) design with "L" shape dividing wall column (DWC) with one zig-zag wall in a ISOM unit producing FGH product in accordance with an embodiment of the present disclosure.

Hydrotreated light Naphtha 102 is transferred to a deisopentanizer unit 104. An output 106 from the deisopentanizer unit 104 is transmitted to a first total condenser 108 to obtain 1-C5 in step 110 and 112. A reboiler 114 which is coupled at a bottom section of the deisopentanizer unit 104, and an output 116 from the reboiler 114 is transmitted to an ISMO reactor 118. Consequently, an output from the ISMO reactor 118 is transmitted to a stabilizer 128, wherein a top section 122 of the stabilizer 128 is coupled to a partial condenser 124, wherein off gas is removed from the apparatus, and other output is sent back to the stabilizer 128 from the top section in step 126. Furthermore, a bottom section of the stabilizer 128 is coupled to a reboiler 130 whose output 132 is transmitted to a deisohexanizer unit 150 via a eighth partial condenser 164, whose input 162 is received from the mid-section of the deisohexanizer unit 150 and the output 166 of the eighth partial condenser 164 is transmitted to the mid-section of the deisohexanizer unit 150.

A zig-zag wall 134 is placed inside the deisohexanizer unit 150 at a middle section and an 'T' shaped wall 158 placed at a bottom section of the deisohexanizer unit 150 (as shown in FIG. 5). Also, the zigzag wall 134 is placed inside the deisohexanizer unit 150 at the bottom section and an 'L' shaped wall 158 placed at a top section of the deisohexanizer unit 150 (as shown in FIG. 6). A top portion of the deisohexanizer unit 150 is operatively coupled to a fifth partial condenser 140 to obtain light isomerate in step 136 and 138.

A mid-bottom section of the deisohexanizer unit 150 is operatively coupled to a sixth partial condenser 144 via an outlet pipe 142 to obtain FGH in step 146 and 148. Further, the bottom section of the deisohexanizer unit 150 is coupled to a seventh partial condenser 152 to obtain heavy isomerate in step 154. Also, n-C6 stream 156 is concentrated.

In operation, two conventional columns in the ISOM unit which is the DIH column and the FGH column are replaced with a single DWC consisting of two walls zig-zag 134 and L or inverted L 158. The walls are strategically placed inside the DIH column 150 to ensure isolation of the C6 recycle stream 160, and the FGH product stream 148 from the mixing effects of column feed, and the light isomerate 138 and heavy isomerate products 154 drawn from the same column as top and bottom products. The innovative design eliminates the need for an additional column (FGH Column) and other associated equipment like reboiler and bottoms pumps.

Figure 7:
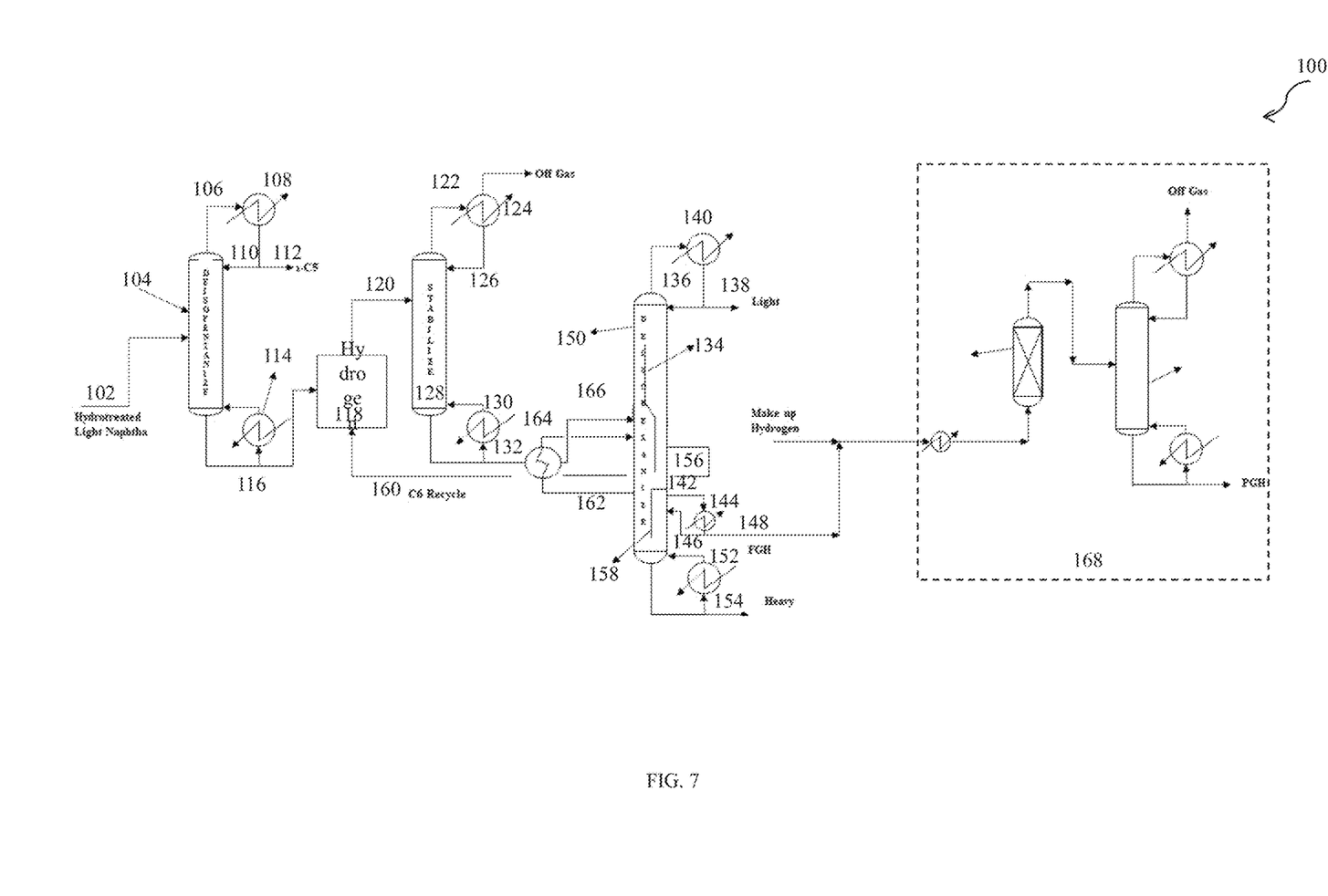
FIG. 7 is a schematic representation of an exemplary embodiment of a four-cut middle DWC, with two walls wherein Deisohexanizer (DIH) design with one zig-zag wall in ISOM unit along with benzene saturation unit in the downstream in accordance with an embodiment of the present disclosure.

In some embodiment of the invention, a once-through ISOM unit (as in FIG. 1) with no recycle to the reactor and using a Top DWC or the middle DWC for FGH can be used. But in case recycle to the ISOM reactor is required along with light and heavy isomerates and FGH products the DIH column can be replaced with a single middle DWC with two walls (as shown in FIG. 5 and FIG. 6). The invention allows the same three products from a single column, while allowing C6 recycle back to the reactor, eliminating loss of RON in the final product. From this FGH product the benzene content can be brought down by using a benzene saturation unit 168 (as shown in FIG. 7).

In one specific embodiment, the one or more secondary vertical walls may correspond to one or more alternate secondary vertical walls which is placed in the column in addition to the at least one primary vertical wall, the one or more alternate secondary vertical walls covers predetermined plurality of trays or packing that divides the column vertically into another set of two parts, wherein a top section of the wall is open and there is mass transfer between vapor and liquid with the column section above the dividing wall, wherein a bottom section of the wall is closed and there is no mass transfer between vapor and liquid with the column section below the dividing wall.

In one exemplary embodiment, the dividing wall column may have only one primary wall. There would be one or more secondary dividing walls in the column. Each wall produces one distinct side product from the column. For example, with one primary and one secondary wall, there will be two side cut products. Total there may be four products from the column which may include a top product, a bottom product, a first side cut, and a second side cut.

In such embodiment, for a dividing wall combination with one primary+secondary wall 1, there may be two separate condensing arrangements. One condensing arrangement provides reflux to the top section of the column. Another condensing arrangement provides reflux to the top of secondary wall 1.

In such another embodiment, for a dividing wall combination with one primary+secondary wall 2, There will be two separate re-boiling arrangements. One re-boiling arrangement provides vapors to the bottom section of the column. Another re-boiling arrangement provides vapor in the bottom section of secondary wall 2.

Embodiments of the present disclosure enable the apparatus with the stabilizer column with half "T" shaped dividing wall is preventing loss of LPG into off-gas. In the present disclosure, the stabilizer column enables the recirculation of non-condensed vapour rich in LPG from the partial condenser and allow to separate LPG from off-gas, which in turn prevents the loss of LPG into off-gas in the petroleum refinery and contributes to fulfilling the rising demand of LPG in industrial and domestic applications.

Also, the present disclosure for the naphtha splitter column with inverted L shaped dividing wall is providing high purity in the distilled products. The naphtha splitter column enables the elimination of steam in deisopentanizer column reboiler and reduction in fired heater duty in Naphtha Splitter Column.

Furthermore, the dividing wall column is providing four high purity cuts from the same process. The apparatus also enables in increasing the output depending on the input feeder configuration. Moreover, the capital and energy costs normally invested in a separation unit is saved by the use of the present disclosure. Use of vertical wall enables in decreasing the length of the dividing wall column. The DWC reduces the need of second column, saves capital and energy costs because they eliminate the need of second column. Inside a DWC the intrinsic remixing of the components is avoided which removes the thermodynamic inefficiency associated with the conventional column thereby giving better purity products at lower energy costs.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. An apparatus located in a dividing wall column for an isomerization unit, wherein the apparatus comprises:
    at least one primary vertical wall located at a first set of predetermined plurality of trays in the dividing wall column and configured to separate a feed from a first side cut, wherein a primary top section of the at least one vertical wall is open and configured for mass transfer between vapor and liquid between a column section above the at least one vertical wall, wherein a primary bottom section of the at least one vertical wall is open and configured for mass transfer between vapor and liquid with a column section below the at least one vertical wall;
    one or more secondary vertical walls placed at a second set of predetermined plurality of trays in the dividing wall column and configured to enable a second side cut wherein each of the one or more secondary vertical walls consists at least one predetermined shape, wherein the dividing wall column produces four cuts wherein one is a hexane cut, wherein a secondary top section of the one or more secondary vertical walls is closed and there is no mass transfer between vapor and liquid with a column section above the one or more secondary vertical walls, wherein a secondary bottom section of the wall is open and there is mass transfer between vapor and liquid with a column section below the one or more secondary vertical walls, wherein there are two walls in different sections of the column,
    characterized in that,
    wherein the at least one primary vertical wall consists of one of a straight wall, an 'L' shaped wall, an 'T' shaped wall, and a zig-zag wall, wherein the zig-zag wall is configured to provide more active area on a feed side,
    wherein the one or more secondary vertical walls are mechanically coupled to form a second vertical wall;
    a pump is located around the one or more secondary vertical walls, and configured to reduce a reboiler duty; and
    a benzene saturation unit configured to produce Polymer Grade Hexane (PGH) upon reducing the concentration of benzene in the produced Food Grade Hexane FGH), wherein the benzene saturation unit is operatively coupled with the dividing wall column so that the hexane produced by the dividing wall column is sent to the benzene saturation unit which consists of a reactor to minimize the benzene by hydrogenating part of benzene present in FGH to produce PGH, and wherein the benzene saturation consists of:

an upstream mixer unit configured to mix the hexane product with hydrogen; and a stripper column configured to separate the hexane of a pre-defined grade from lighter hexane.

2. The apparatus of claim 1, wherein the at least one primary vertical wall located at the first set of predetermined trays is aligned parallel to an axis of the dividing wall column.

3. The apparatus of claim 1, wherein the predetermined shape of each of the one or more secondary vertical walls is arranged in the form of a "L" shape structured by placing two walls perpendicular to each other, wherein one edge of the one of the one or more secondary vertical walls are attached to a side of the dividing wall column, wherein the "L" shape structure formed is placed in one of an inverted position or an upward position with respect to the dividing wall column, wherein a reflux of the second side cut is provided to the "L" shaped structure, wherein the at least one primary vertical wall structure is configured to produce hexane of a pre-defined grade, Special Boiling Point (SBP) solvents, or a combination thereof.

4. The apparatus of claim 1, wherein the dividing wall column further comprises an overhead stream output pipeline for light isomerate overhead cut, wherein a reflux of an overhead stream portion is provided to an overhead section of the dividing wall column.

5. The apparatus of claim 1, wherein the dividing wall column further comprises a bottom stream output pipeline for heavy isomerate bottom stream cut, wherein a reflux of a bottom stream portion is provided to a bottom section of the dividing wall column.

6. The apparatus of claim 1, comprising a mid-cut condenser (Hexane condenser) integrated with process streams, and configured to function as a heat exchanger.

7. The apparatus of claim 1, wherein an upper section of the column comprises a middle dividing wall and a lower section of the column comprises a "T" shaped wall, wherein a top part of the "T" shaped wall is isolated from rest of the column with no mass transfer, wherein the "T" shaped wall has a separate condensing arrangement for the one of a mid-cut.

8. The apparatus of claim 1, comprising a deisohexanizer column in the Isomerization Unit configured to produce four cuts using two distinct dividing walls, wherein the four cuts comprise Light Isomerate (C6−), Recycle to a reactor (C6), Food Grade Hexane (C6 cut with minimum 35 wt % n hexane) and Heavy Isomerate (C6+).

9. The apparatus of claim 8, wherein the deisohexanizer column comprises three product streams, comprising a dividing wall in a middle section of the deisohexanizer column.

10. The apparatus of claim 1, wherein the one or more secondary vertical walls corresponds to one or more alternate secondary vertical walls which is placed in the column in addition to the at least one primary vertical wall, the one or more alternate secondary vertical walls covers predetermined plurality of trays or packing that divides the column vertically into another set of two parts, wherein a top section of the one or more alternate secondary vertical wall is open and there is mass transfer between vapor and liquid with the column section above the dividing wall, and wherein a bottom section of the one or more alternate secondary vertical wall is closed and there is no mass transfer between vapor and liquid with the column section below the dividing wall.

* * * * *